US006731596B1

(12) United States Patent
Chiang et al.

(10) Patent No.: US 6,731,596 B1
(45) Date of Patent: May 4, 2004

(54) NETWORK SWITCH HAVING SYSTEM FOR AUTOMATICALLY DETECTING CHANGE IN NETWORK NODE CONNECTION

(75) Inventors: John Chiang, San Jose, CA (US); Shashank Merchant, Sunnyvale, CA (US); Robert Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/283,286

(22) Filed: Apr. 1, 1999

(51) Int. Cl.[7] .................................................. H04J 3/14
(52) U.S. Cl. ..................... 370/217; 370/225; 370/389; 370/412; 370/429; 714/2
(58) Field of Search ................................ 370/389, 401, 370/412–413, 415–416, 428–429, 216–218, 225, 228, 419–420, 463, 392, 501–502, 475; 714/2; 711/216, 221; 709/213

(56) References Cited

U.S. PATENT DOCUMENTS

| 5,515,376 A |   | 5/1996  | Murthy et al. |
|---|---|---|---|
| 5,651,002 A | * | 7/1997  | Van Seters et al. |
| 5,684,800 A | * | 11/1997 | Dobbins et al. |
| 5,889,776 A | * | 3/1999  | Liang |
| 6,108,692 A | * | 8/2000  | Van Seters et al. ......... 709/213 |
| 6,205,122 B1 | * | 3/2001  | Sharon et al. |
| 6,330,229 B1 | * | 12/2001 | Jain et al. |
| 6,335,932 B2 | * | 1/2002  | Kadambi et al. |
| 6,356,551 B1 | * | 3/2002  | Egbert ........................ 370/389 |
| 6,400,681 B1 | * | 6/2002  | Bertin et al. ................ 370/218 |

* cited by examiner

Primary Examiner—Dang Ton
Assistant Examiner—Inder Pal Mehra

(57) ABSTRACT

A novel system and method of automatically detecting a change in network node connection in a multiport data switching system having receive ports for receiving data packets from network nodes, and a decision making engine for controlling data forwarding. Data blocks representing received data packets are placed in data queues corresponding to the receive ports. The data queues are transferred to logic circuitry for processing in accordance with a predetermined algorithm. This processing includes automatically detecting a change in connection between at least one of the network nodes and at least one of the receive ports, based on a search of an address table having address information relating to the receive ports. The address table may be searched for an address entry having a source address and VLAN address information that match a source address and VLAN address information of the received data packet. Receive port data written in the address entry having matching address information are checked to determine whether these data identify a receive port arranged in the same trunk as the receive port, from which the data packet is transferred. The address entry is automatically updated with new information, if the receive port identified in the address entry and the actual receive port are in different trunks.

20 Claims, 8 Drawing Sheets

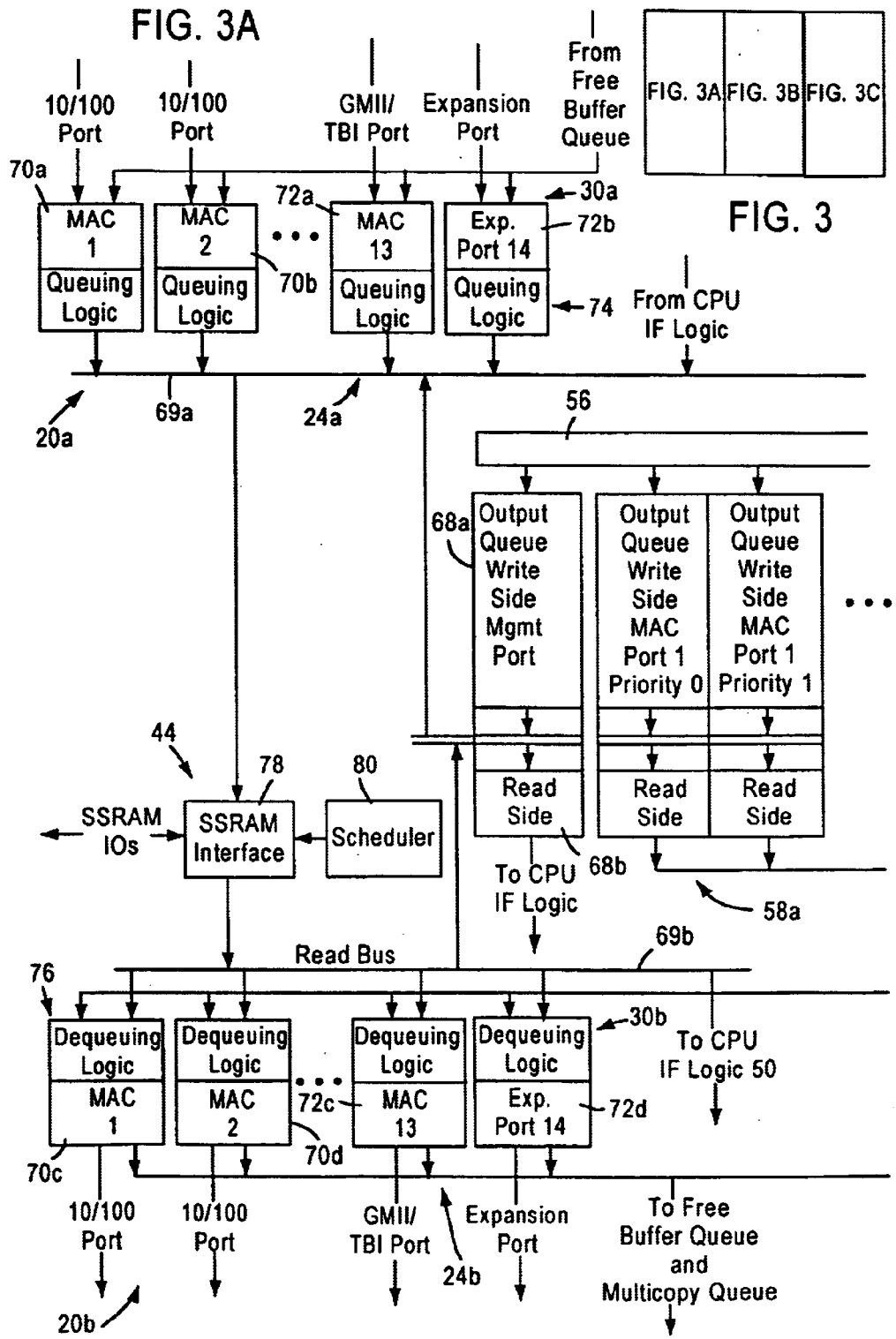

NETWORK SWITCH HAVING SYSTEM FOR AUTOMATICALLY DETECTING CHANGE IN NETWORK NODE CONNECTION

FIELD OF THE INVENTION

This invention relates to data communication systems, and more particularly, to a system for automatically detecting a change in connection of a network node to a multiport network switching system.

BACKGROUND ART

A multiport switch may be provided in a data communication network to enable data communication between multiple network nodes connected to various ports of the switch. A logical connection may be created between receive ports and transmit ports of the switch to forward received frames to appropriate destinations. Based on frame header information, a decision making engine selectively controls forwarding received frames to a destination station. To make the frame forwarding decision, the decision making engine searches a look-up address table that stores receive ports information.

In the address table, a network node address may be associated with a certain switch port. As a result, if a network node is disconnected from the original switch port and plugged into a new switch port, data addressed to the network node may still be forwarded to the original port instead of the new port.

Thus, it would be desirable to provide a network switch with a system for automatically detecting a change in network node connection.

DISCLOSURE OF THE INVENTION

The invention provides a novel system and method of automatically detecting a change in connection of a network node to a multiport network switching system having receive ports for receiving data packets from network nodes, and a decision making engine for controlling data forwarding. Data blocks representing received data packets are placed in data queues corresponding to the receive ports. The data queues are transferred to logic circuitry for processing in accordance with a predetermined algorithm. This processing includes the step of automatically detecting a change in network node connection as a result of disconnecting at least one of the network nodes from one of the receive ports and connecting the at least one of the network nodes to another receive port. The change in network node connection is detected based on a search of an address table having address information relating to the receive ports.

In a preferred embodiment, the address table is searched for an address entry having address information that matches corresponding address information of a data packet. For example, the address table may be searched for an address entry having a source address and VLAN address information that match a source address and VLAN address information of the data packet. A new address entry may be created if the address entry having matching address information is not found in the address table.

The detecting step may comprise determining whether receive port data written in the address entry having matching address information correspond to the receive port, from which the data packet is transferred. The address entry is automatically updated with new information, if the receive port data written in the address entry do not correspond to the receive port.

For example, the detecting step may comprise determining whether receive port data written in the address entry identify a receive port arranged in the same trunk as the receive port, from which the data packet is transferred. If not, the address entry is updated with information on the new receive port.

The address entry may contain a static bit provided to prevent the address entry from being deleted when the static bit is in a predetermined state. The detecting step may comprise checking the static bit to prevent the address entry from being updated if the static bit is in the predetermined state.

In accordance with another aspect of the invention, a multiport data communication system is provided for transferring data packets between ports. The data communication system comprises a plurality of receive ports for receiving data packets from a plurality of network nodes, and a decision making engine responsive to the received data packets for controlling transmission of the received data packets. The decision making engine includes a plurality of queuing devices corresponding to the plurality of receive ports for creating queues of data blocks representing the data packets received by the corresponding receive ports, an address table storage for storing an address table having address information relating to the plurality of the receive ports and logic circuitry responsive to the plurality of queuing devices for processing the data blocks in accordance with a prescribed algorithm to identify destination for each data packet. The logic circuitry comprises a detecting circuit for automatically detecting a change in connection between at least one of the plurality of network nodes and at least one of the plurality of receive ports, based on a search of the address table.

Various objects and features of the present invention will become more readily apparent to those skilled in the art from the following description of a specific embodiment thereof, especially when taken in conjunction with the accompanying drawings.

BEST MODE FOR CARRYING OUT THE INVENTION

Figure 1:
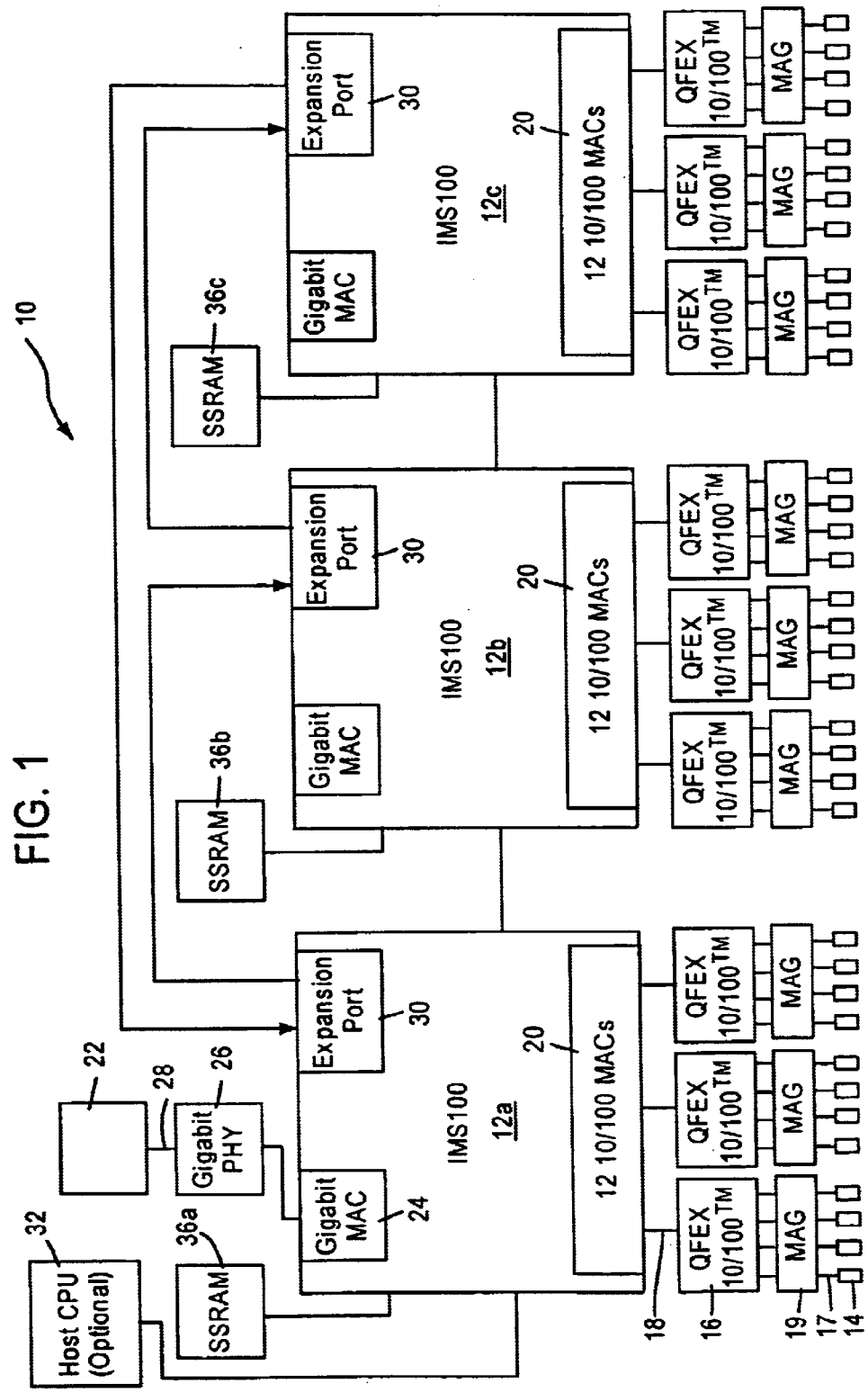
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the switches 12 selectively forward data packets received from the network nodes 14 or 22 to the appropriate destination based upon Ethernet protocol.

Each switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each switch 12 also includes a gigabit MAC port 24 for sending and receiving data packets to and from a gigabit PHY 26 for transmission to the gigabit node 22 via a high speed network medium 28.

Each 10/100 Mb/s network station 14 sends and receives data packets to and from the corresponding switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding switch 12.

Each switch 12 is coupled to 10/100 physical layer (PHY) transceivers 16 configured for sending and receiving data packets to and from the corresponding switch 12 across a corresponding media independent interface (MII) 18. A magnetic transformer 19 provides AC coupling between the PHY transceiver 16 and the corresponding network medium 17. Each switch 12 also includes an expansion port 30 for transferring data between other switches according to a prescribed protocol.

Figure 2:
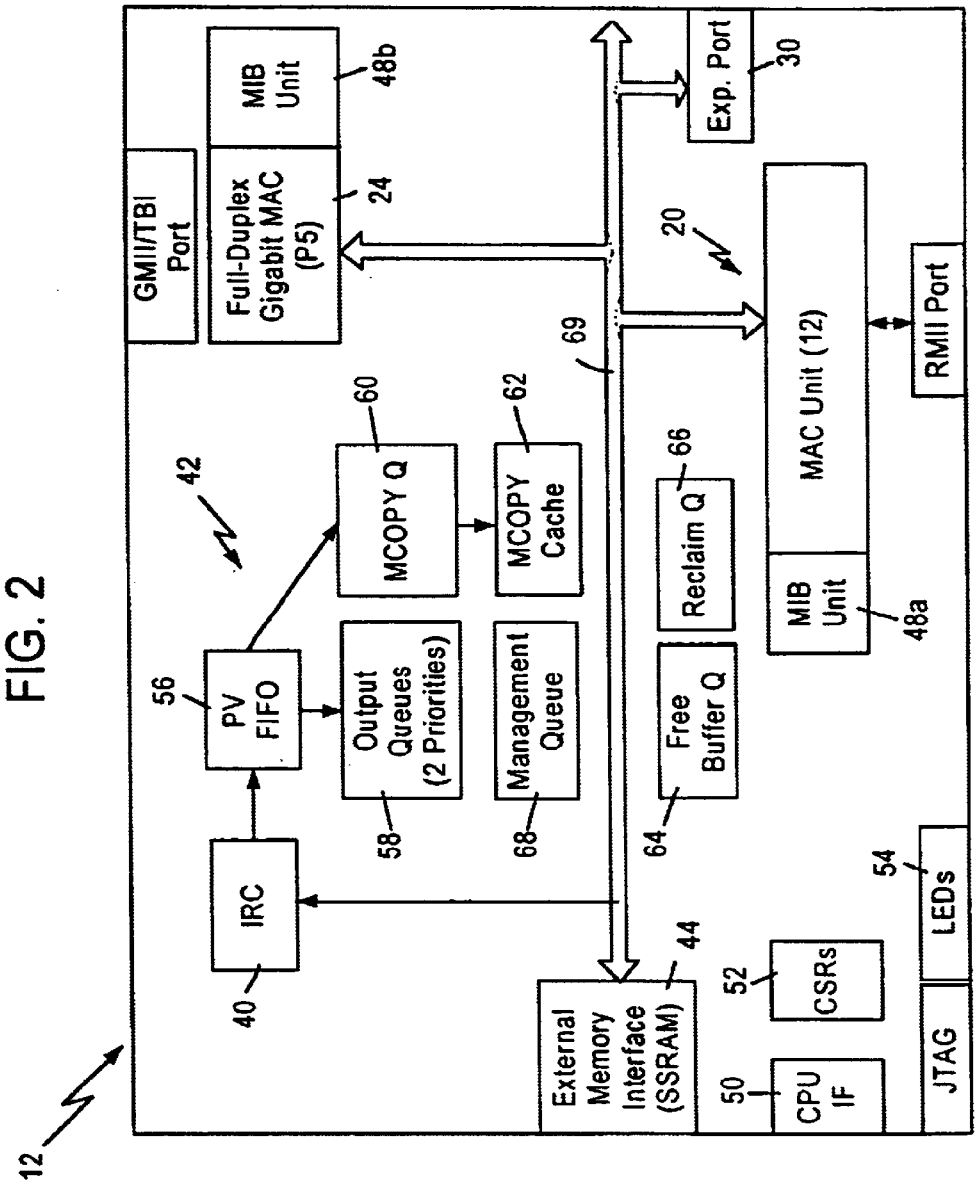
FIG. 2 is a block diagram of the multiple port switch of FIG. 1.

FIG. 2 is a block diagram of the switch 12. The switch 12 contains a decision making engine 40 that performs frame forwarding decisions, a switching subsystem 42 for transferring frame data according to the frame forwarding decisions, a buffer memory interface 44, management information base (MIB) counters 48, and MAC (media access control) protocol interfaces 20 and 24 to support the routing of data packets between the Ethernet (IEEE 802.3) ports serving the network stations 14 and 22. The MIB counters 48 provide statistical network information in the form of management information base (MIB) objects to an external management entity controlled by a host CPU 32, described below.

The external memory interface 44 enables external storage of packet data in a synchronous static random access memory (SSRAM) 36 in order to minimize the chip size of the switch 12. In particular, the switch 12 uses the SSRAM 36 for storage of received frame data, and memory structures. The memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The switch 12 also includes a processing interface 50 that enables an external management entity such as a host CPU 32 to control overall operations of the switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data frames received from one source to at least one destination station.

The switch 12 also includes an LED interface 54 that clocks out the status of conditions per port and drives external LED logic. The external LED logic drives LED display elements that are human readable.

The switching-subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet, including source, destination, and virtual LAN (VLAN) address information. The IRC 40 uses the header information to determine which MAC ports will output the data frame stored at the location specified by the frame pointer. The decision making engine may thus determine that a given data frame should be output by either a single port, multiple ports, or all ports (i.e., broadcast). Also, the IRC 40 may decide that the frame should not be forwarded to any port.

For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header. The IRC 40 may also determine that the received data frame should be transferred to another switch 12 via the expansion port 30. Hence, the internal rules checker 40 will decide whether a frame temporarily stored in the buffer memory 36 should be output to a single MAC port or multiple MAC ports.

The internal rules checker 40 outputs a forwarding decision to the switch subsystem 42 in the form of a forwarding descriptor. The forwarding descriptor includes a port vector identifying each MAC port that should receive the data packet, priority class identifying whether the frame is high priority or low priority, VLAN information, Rx port number, Opcode, and frame pointer. The port vector identifies the MAC ports to receive the data packet for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data packet transmission. In other words, the port vector FIFO 56 supplies the frame pointer on a per-port basis. The output queues 58 fetch the data packet identified in the port vector from the external memory 36 via the external memory interface 44, and supply the retrieved data packet to the appropriate transmit FIFO of the identified ports. If a data packet is to be supplied to a management agent, the frame pointer is also supplied to a management queue 68, which can be processed by the host CPU 32 via the CPU interface 50.

The multicopy queue 60 and the multicopy cache 62 keep track of the number of copies of the data packet that are fetched from the respective output queues 58, ensuring that the data packet is not overwritten in the SSRAM 36 until the appropriate number of copies of the data packet have been output from the SSRAM 36. Once the number of copies output corresponds to the number of ports specified in the port vector FIFO 56, the frame pointer is forwarded to the reclaim queue 66. The reclaim queue 66 stores frame pointers that can be reclaimed by the free buffer queue 64 as free pointers. After being returned to the free buffer queue 64, the frame pointer is available for reuse by the MAC unit 20 or the gigabit MAC unit 24.

Figure 3B:
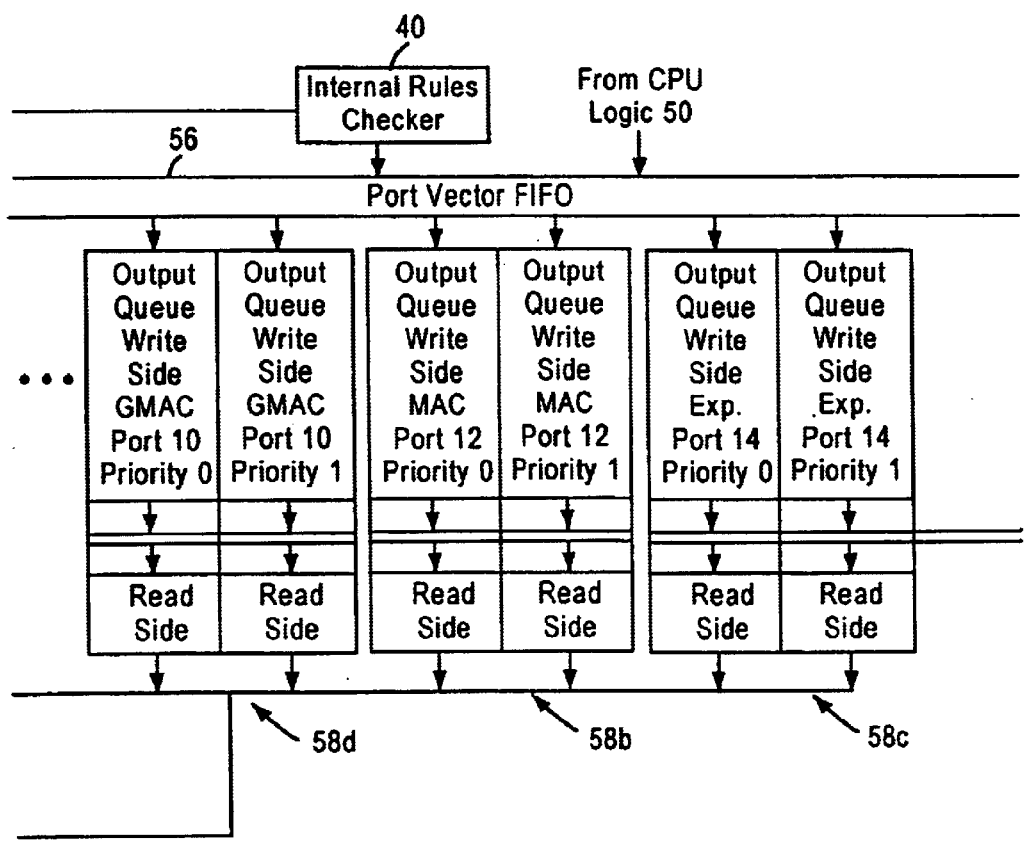
FIG. 3 is a block diagram illustrating in detail the switching subsystem of FIG. 2.
Figure 3C:
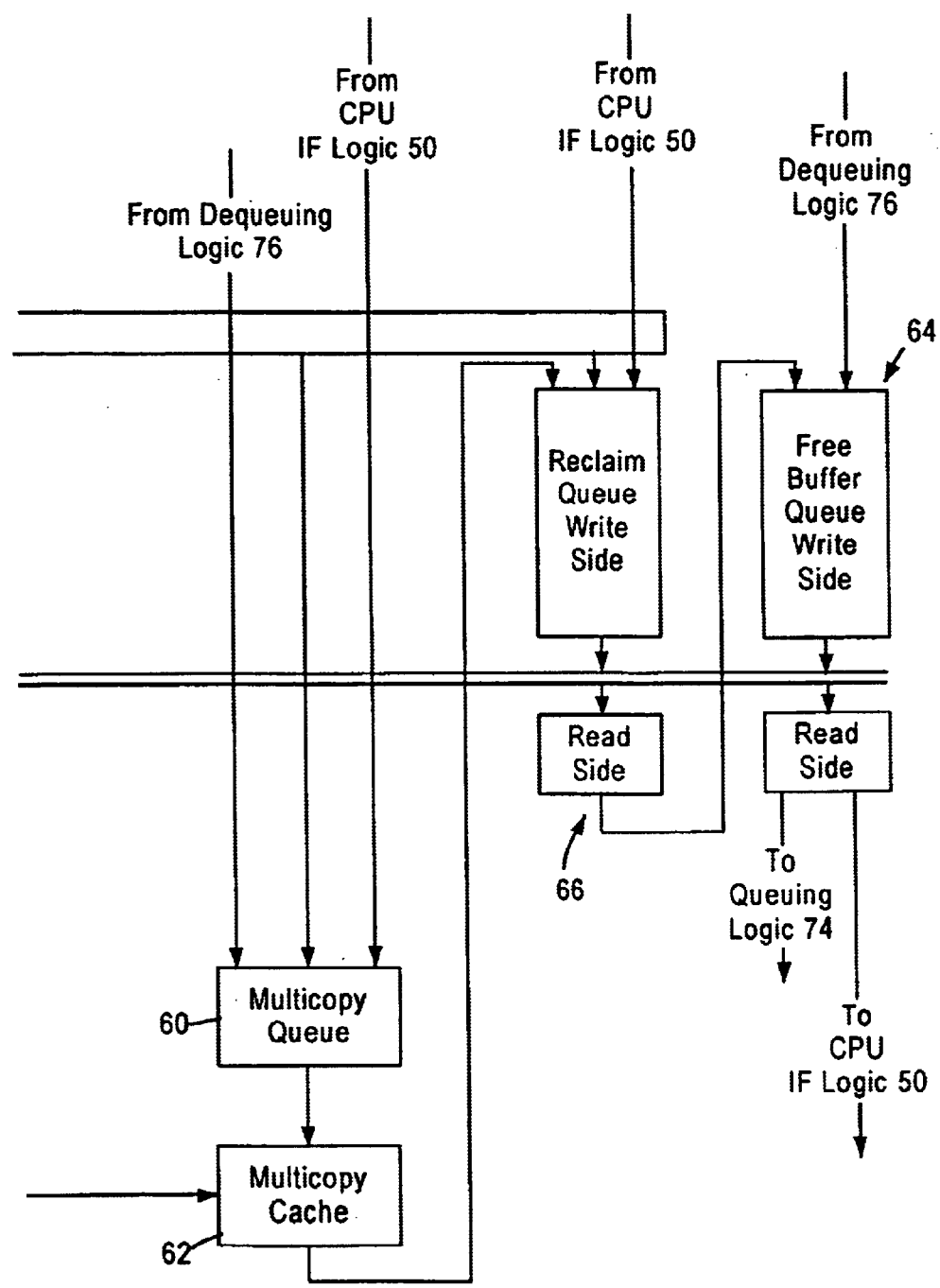

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 by any switch port to the external memory 36, and an SSRAM interface 78 for performing the read and write operations with the SSRAM 36. In particular, the switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot based on the retrieved frame pointer. The frame is stored in the location pointed to by the free buffer pointer obtained from the free buffer pool 64, although a number of other buffers may be used to store a frame, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue, e.g. at least one of the queues 58 or the management queue 68, should receive the associated frame pointer. The port vector FIFO 56 places the frame pointer into the top of the appropriate queue 58 and/or 68. This queues the transmission of the frame. The output queue 68 is processed separately by the host CPU 32 via the CPU interface 50.

As shown in FIG. 3, each of the transmit MAC units 70d, 70e, 70f, 72d, and 72c have an associated output queue 58a, 58b, 58c, 58d, and 58e, respectively. Preferably, each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example the output queue 58e for the gigabit transmit MAC 72c. The dequeuing logic 76 for the transmit gigabit port 24b takes the frame pointer from the corresponding gigabit port output queue 58e, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the frame has been transmitted to its designated output port(s). In particular, the dequeuing logic passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO also copies the frame pointer and the copy count to the multicopy queue 60. The multicopy queue writes the copy count to the multicopy cache 62. The multicopy cache is a random access memory having a single copy count for each buffer in external memory (i.e., each frame pointer).

Once the dequeuing logic 76 retrieves the frame data for a particular output port based on a fetched frame pointer and stores the frame data in the transmit FIFO, the dequeuing logic checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list chain of frame pointers to identify the entire stored data frame. The reclaim queue 66 traverses the chain of buffer locations identified by the frame pointers, and passes the frame pointers to the free buffer queue 64.

As discussed above, the internal rules checker (IRC) 40 monitors the write bus to capture frame header information (including source, destination, and VLAN address information) and frame pointers associated with received frames. The IRC 40 uses the frame pointer value and the associated header information to determine which MAC ports will output the data frame stored at the location specified by the frame pointer.

Figure 4:
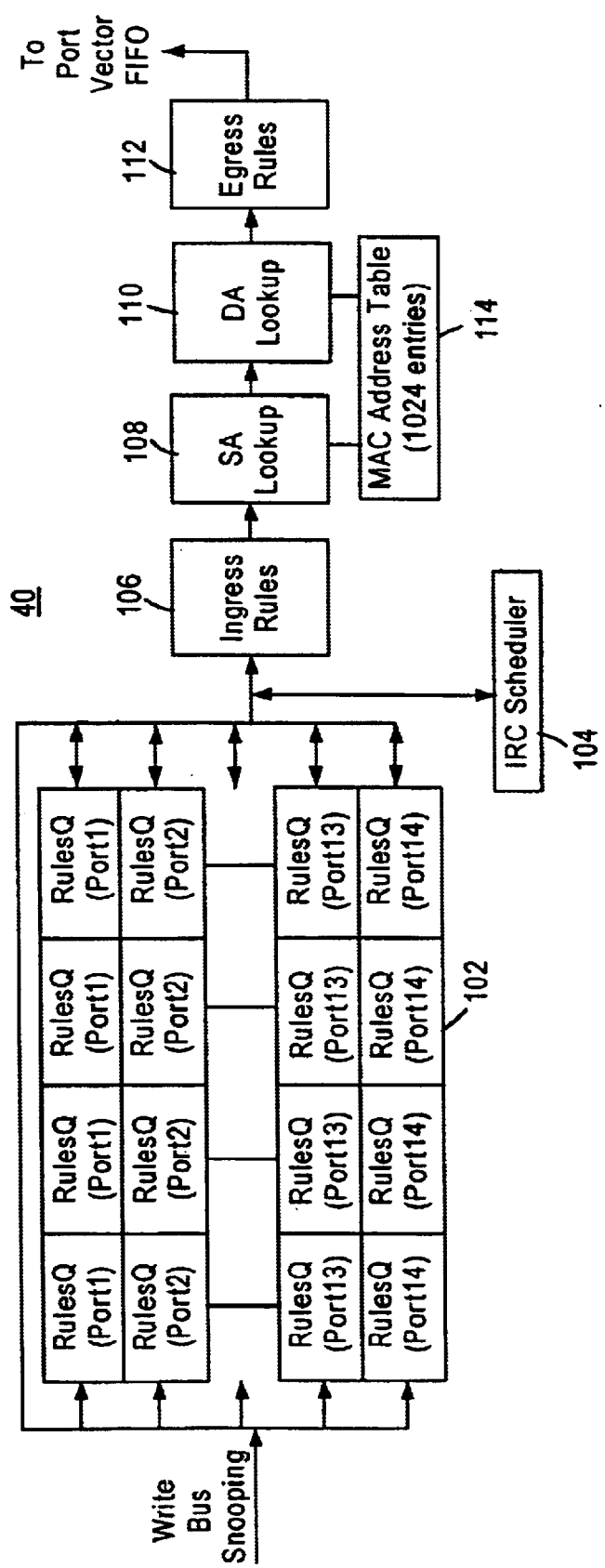
FIG. 4 is a block diagram of an internal rules checker (IRC) of the present invention.

As shown in FIG. 4, the IRC 40 may contain multiple rules queues 102 arranged for holding frame pointers and frame header information. A single rules queue 102 is assigned to each receive port of the IMS 12 for storing information associated with the frames received via the corresponding port. In particular, rules queues 1 to 12 may be provided for 10/100 MAC ports 1 to 12 configured to receive data from the corresponding 10/100 Mb/s network stations 14, a rules queue 13 may be arranged to support the gigabit MAC port 24 capable of receiving data from the gigabit network node 22, and a rules queue 14 may be assigned to the expansion port 30. In each rules queue 102, frame headers may be stored in a static random access memory (SRAM) having four 40-byte entries, and frame pointers may be stored in a SRAM having four 13-bit entries.

Frame headers and frame pointers from the rules queues 102 are transferred to IRC logic circuits such as ingress rules logic 106, source address (SA) lookup logic 108, destination address (DA) lookup logic 110 and forward descriptor (FD) generator 112 to produce a forwarding descriptor supplied to the port vector FIFO 56. The IRC scheduler 104 provides time slots for sequential transferring data held in the rules queues 102 to the IRC logic circuitry.

The ingress rules logic 106 detects whether a frame was received with an error and checks for preset DA and VLAN information. If an error is detected or the frame address information does not match with allocated DA addresses or VLAN data, the ingress rules logic 106 produces a forwarding descriptor with a null port vector. This forwarding descriptor is transferred directly to the port vector FIFO 56 without performing SA and DA lookup operations and egress rules operations.

The SA and DA lookup logic circuits 108 and 110 search an IRC address table 114 for entries associated with the MAC source and destination addresses for the corresponding frame. If source and destination address data of a frame match with the address table entries, the FD generator 112 checks each transmit port in the port vector list produced by the DA lookup logic circuit 110 to remove or mask the disabled ports, the ports that do not belong to a required VLAN, and the port, from which the frame is received. As a result, the FD generator 112 generates a forwarding descriptor including a port vector identifying each MAC port that should receive the corresponding frame. As described in more detail below, the SA lookup logic 108 automatically detects a change in network node connection as a result of disconnecting a network node from one receive port of the switch 12 and connecting the network node to another receive port of the switch 12.

Figure 5:
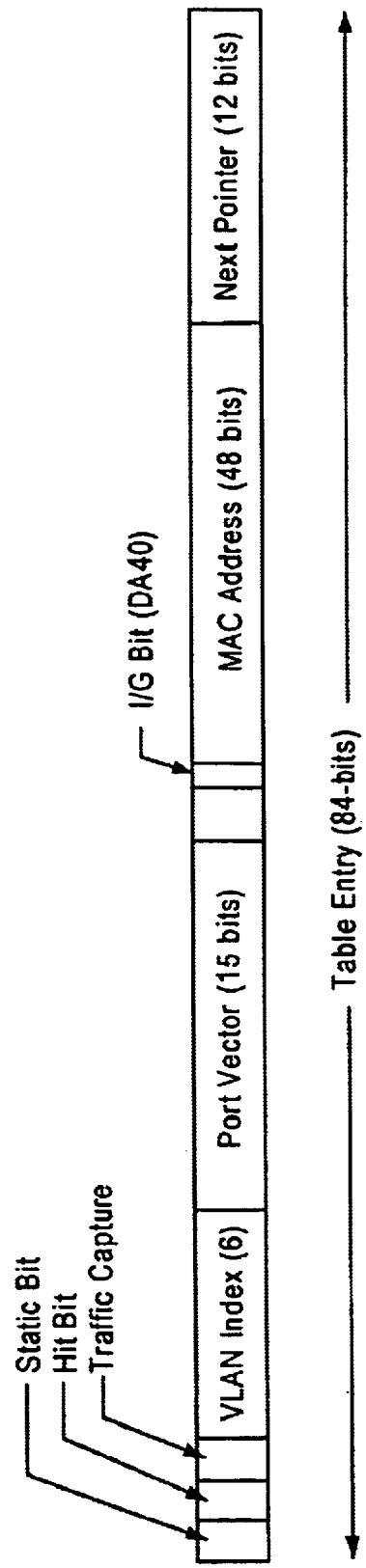
FIG. 5 is a diagram illustrating the format of an address entry in the IRC address table.

The IRC address table 114 is arranged as an array with multiple address entries. For example, 4096 address entries may be used. As illustrated in FIG. 5, each IRC address entry may contain 84 bits including a static bit, a hit bit, a traffic capture bit, a 6-bit VLAN index, a 15-bit port vector, a 48-bit MAC address, and a 12-bit next pointer.

The switch 12 may be provided with an aging algorithm, which can automatically delete old entries. The static bit is provided to prevent the aging algorithm from deleting an entry, in which the static bit is set.

The hit bit is also used to support the aging algorithm. Whenever the IRC finds source address and VLAN index match or creates a new entry in the IRC address table 114, it sets the hit bit. The aging algorithm periodically polls the hit bits of all entries, and if both the hit bit and the static bit are clear, the entry will be deleted from the table. If the hit bit is set and the static bit is clear, the aging mechanism clears the hit bit.

The traffic capture bit identifies capture of MAC address data for reporting MAC communications to the management queue. The VLAN index field contains an index for accessing VLAN identification information that may be stored in a separate VLAN ID table. This field may be updated by the host CPU. The port vector provides the forwarding descriptor with a vector describing the ports that the frame should be forwarded to. The MAC address field provides source and destination addresses, and the receive port number used for matching the corresponding address information of a received frame. The next pointer identifies the location of the next address entry.

As discussed above, a network node address may be associated in an address table with a certain original switch port. If a network node is disconnected from the original switch port and plugged into a new switch port, data addressed to the network node may still be forwarded to the original port instead of the new port.

The present invention provides automatic detection of a change in network node connection using a SA lookup procedure performed by the SA lookup logic circuit 108. The IRC 40 automatically learns unknown source address obtained from a frame received by a particular switch port, and add a new address entry to the IRC address table 114. However, if the existing source address and VLAN index is obtained from a frame received from a new switch port rather than from the original switch port, the IRC 40 automatically updates the existing address entry to indicate the change in network node connection.

Figure 6:
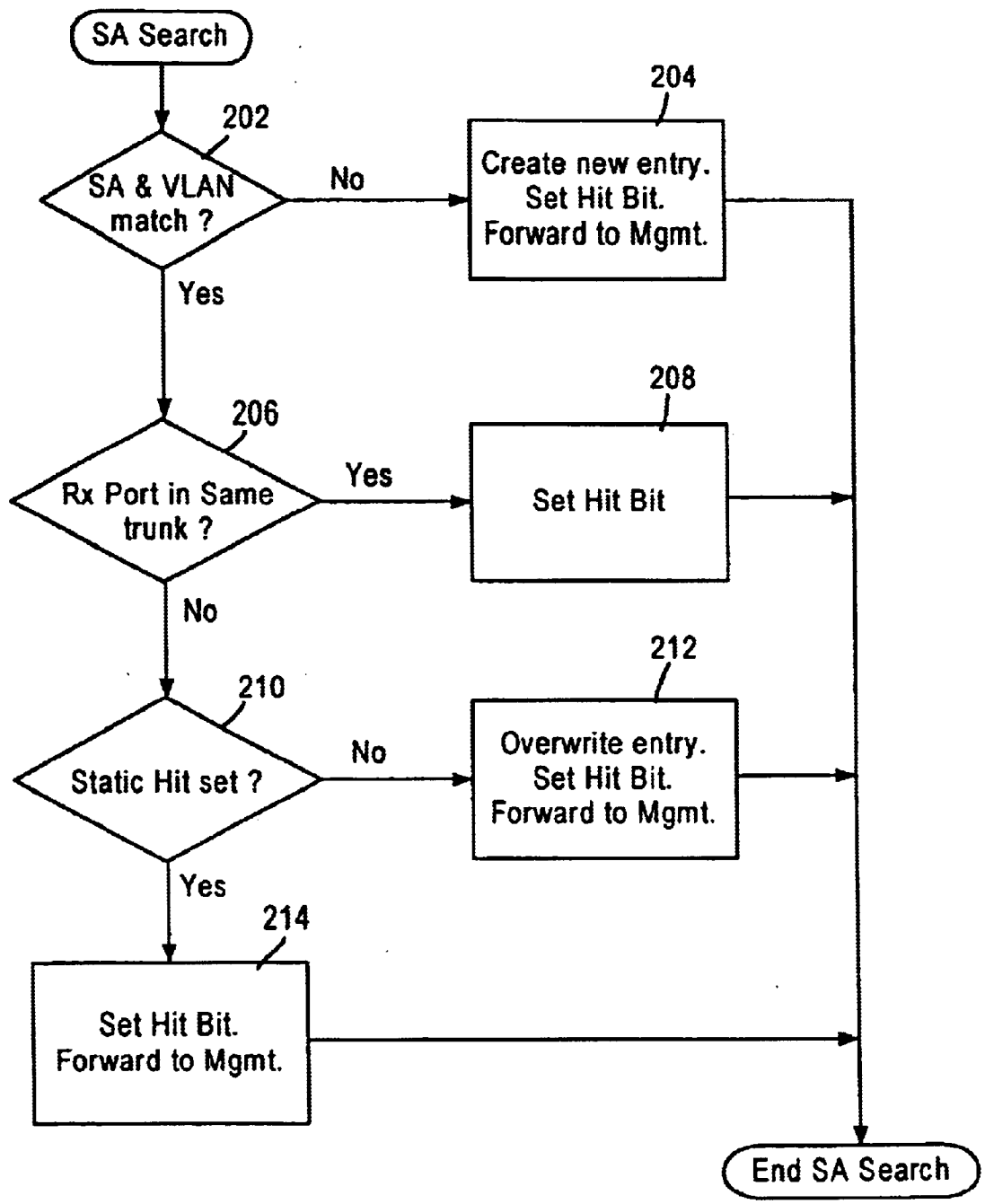
FIG. 6 is a flow-chart illustrating automatic detection of a change in network node connection in accordance with the present invention.

Referring to FIG. 6, the SA lookup logic circuit 108 performs the SA lookup procedure to search the IRC address table 114 for SA and VLAN address information and receive port information. The source address of the received frame and the VLAN index assigned to the received frame may be used to create a search key, based on which the IRC 40 determines the address entry to be searched. The VLAN index may be assigned to the received frame based on the VLAN tag of the frame. If the received frame does not contain a VLAN tag, the VLAN index may be found in a preset VLAN index table using the number of the receive port.

In step 202, the IRC 40 searches for an address entry whose source address and VLAN index match the source address and VLAN index of the received frame. If the search does not find a match, the IRC 40 may add to the IRC address table a new address entry having the source address and VLAN index of the received frame (step 204). This entry is created with the hit bit set and the static bit cleared. Also, the IRC 40 produces a forwarding descriptor for this frame with the port vector for the management queue 68.

If the search finds a match for the source address and the VLAN index of the received frame, the IRC 40 determines whether or not the receive port identified in the address entry and the receive port that received the frame are in the same trunk (step 206). If so, the IRC 40 sets the hit bit in the address entry containing matching information (step 208).

If the receive port identified in the address entry and the receive port that received the frame are in different trunks, the IRC 40 determines whether or not a static bit is set in the address entry that contains matching SA and VLAN information (step 210). If the static bit is not set, the IRC 40 updates the address entry that contains matching SA and VLAN information with new receive port data, sets the hit bit in the updated address entry and sets a management queue bit in the forwarding descriptor to report the update to the management queue 68 (step 212). Thus, the IRC 40 automatically detects disconnection of a network node from one receive port and connection of the network node to a new switch port, and updates the IRC address table 110 to indicate a new network node connection.

If the static bit is set, the IRC 40 sets the hit bit in the address entry that contains matching SA and VLAN information, and sets a management queue bit in the forwarding descriptor to report the event to the management queue 68 (step 214).

In this disclosure, there are shown and described only the preferred embodiments of the invention, but it is to be understood that the invention is capable of changes and modifications within the scope of the inventive concept as expressed herein.

What is claimed is:

1. A multiport data communication system for transferring data packets between ports, the data communication system comprising:

a plurality of receive ports for receiving data packets from a plurality of network nodes, a decision making engine responsive to the received data packets for controlling transmission of the received data packets, the decision making engine including:

a plurality of queuing devices corresponding to the plurality of receive ports for creating queues of data blocks representing the data packets received by the corresponding receive ports, an address table storage for storing an address table having address information relating to the plurality of the receive ports and logic circuitry responsive to the plurality of queuing devices for processing the data blocks in accordance with a prescribed algorithm to identify destination for each data packet, said logic circuitry including a detecting circuit for automatically detecting disconnection of at least one of the plurality of network nodes from at least one of the plurality of receive ports and connection of the at least one of the plurality of network nodes to another receive port of the plurality of receive ports, based on a search of the address table.

2. The system of claim 1, wherein the detecting circuit is configured to search the address table for an address entry having address information that matches corresponding address information of a data packet.

3. The system of claim 2, wherein the detecting circuit is configured to determine whether receive port data written in the address entry correspond to a receive port, from which the data packet is transferred.

4. The system of claim 3, wherein the detecting circuit is configured to automatically update the address entry with new information, if the receive port data written in the address entry do not correspond to the receive port.

5. The system of claim 2, wherein the detecting circuit is configured to determine whether receive port data written in the address entry identify a receive port arranged in the same trunk as a receive port, from which the data packet is transferred.

6. The system of claim 4, wherein the address entry contains a static bit to prevent the address entry from being deleted when the static bit is in a predetermined state.

7. The system of claim 6, wherein the detecting circuit is configured to check whether the static bit is in the predetermined state.

8. The system of claim 7, wherein the detecting circuit is prevented from updating the address entry if the static bit is in the predetermined state.

9. The system of claim 2, wherein the detecting circuit is configured to create a new address entry if the address entry having matching address information is not found in the address table.

10. The system of claim 2, wherein the detecting circuit is configured to search the address table for an address entry having a source address and VLAN address information that match a source address and VLAN address information of the data packet.

11. In a network switch having a plurality of receive ports for receiving data packets from a plurality of network nodes, and a decision making engine for controlling data forwarding, a method of data transfer comprising the steps of:

placing data blocks representing received data packets in a plurality of data queues to be processed by the decision making engine, the plurality of data queues corresponding to the plurality of receive ports, and processing the data queues by logic circuitry in accordance with a prescribed algorithm to determine destination for each data packet, said step of processing comprising the step of automatically detecting disconnection of at least one of the plurality of network nodes from at least one of the plurality of receive ports and connection of the at least one of the plurality of network nodes to another receive port of the plurality of receive ports, based on a search of an address table having address information relating to the receive ports.

12. The method of claim 11, wherein the address table is searched for an address entry having address information that matches corresponding address information of a data packet.

13. The method of claim 12, wherein the detecting step comprises determining whether receive port data written in the address entry correspond to a receive port, from which the data packet is transferred.

14. The method of claim 13, wherein the address entry is automatically updated with new information, if the receive port data written in the address entry do not correspond to the receive port.

15. The method of claim 12, wherein the detecting step comprises determining whether receive port data written in the address entry identify a receive port arranged in the same trunk as a receive port, from which the data packet is transferred.

16. The method of claim 14, wherein the address entry contains a static bit to prevent the address entry from being deleted when the static bit is in a predetermined state.

17. The method of claim 16, wherein the detecting step further comprises checking whether the static bit is in the predetermined state.

18. The method of claim 17, wherein the address entry is prevented from being updated if the static bit is in the predetermined state.

19. The method of claim 12, wherein a new address entry is created if the address entry having matching address information is not found in the address table.

20. The method of claim 12, wherein the address table is searched for an address entry having a source address and VLAN address information that match a source address and VLAN address information of the data packet.

* * * * *